(12) United States Patent
Marinoni

(10) Patent No.: US 6,990,780 B2
(45) Date of Patent: *Jan. 31, 2006

(54) MOUNTING STRUCTURE

(75) Inventor: Mirko Marinoni, Magenta (IT)

(73) Assignee: Casma S.p.A., Milan (IT)

(*) Notice: Subject to any disclaimer, the term of this patent is extended or adjusted under 35 U.S.C. 154(b) by 0 days.

This patent is subject to a terminal disclaimer.

(21) Appl. No.: 10/828,891

(22) Filed: Apr. 21, 2004

(65) Prior Publication Data
US 2004/0231254 A1 Nov. 25, 2004

Related U.S. Application Data

(63) Continuation of application No. 10/048,335, filed as application No. PCT/EP99/05540 on Jul. 30, 1999, now Pat. No. 6,745,538.

(51) Int. Cl.
E04B 1/00 (2006.01)

(52) U.S. Cl. ............... 52/584.1; 52/582.1; 52/699; 52/698; 52/582.2; 403/294; 403/296; 403/401; 403/402

(58) Field of Classification Search ............ 52/584.1, 52/582.1, 582.2, 167, 698, 699, 764, 770, 52/780, 781.3, 204.62; 403/294, 296, 401, 403/402; 248/208, 220.1
See application file for complete search history.

(56) References Cited

U.S. PATENT DOCUMENTS

| | | | | |
|---|---|---|---|---|
| 1,417,102 A | * | 5/1922 | Nyman et al. ............... 52/464 |
| 1,548,083 A | | 8/1925 | Young et al. | |
| 2,363,164 A | * | 11/1944 | Waller ..................... 52/282.5 |
| 5,048,243 A | * | 9/1991 | Ward ........................ 52/167.4 |
| 5,163,257 A | * | 11/1992 | Crowell ..................... 52/200 |
| 5,182,891 A | * | 2/1993 | Slocum ....................... 52/480 |
| 5,205,092 A | * | 4/1993 | Taylor ........................ 52/177 |
| 5,487,690 A | * | 1/1996 | Stoffle et al. ............... 446/105 |
| 5,615,918 A | | 4/1997 | Ferrell | |
| 5,758,466 A | | 6/1998 | Tucker | |
| 5,822,936 A | * | 10/1998 | Bateman ..................... 52/281 |
| 5,881,511 A | | 3/1999 | Keller, Jr. | |
| 5,946,874 A | * | 9/1999 | Roberts ....................... 52/464 |
| 6,029,831 A | | 2/2000 | Miller | |
| 6,220,651 B1 | * | 4/2001 | Ehrlich ..................... 296/186.1 |
| 6,415,462 B1 | * | 7/2002 | Perry ............................ 4/614 |
| 6,421,968 B2 | | 7/2002 | Degelsegger | |
| 6,450,564 B1 | * | 9/2002 | Sill ........................ 296/186.1 |
| 6,467,227 B2 | | 10/2002 | Elmer | |

(Continued)

FOREIGN PATENT DOCUMENTS

CL 30021 9/1975

(Continued)

Primary Examiner—Carl D. Friedman
Assistant Examiner—Jennifer I. Thissell

(57) ABSTRACT

The present invention relates to a mounting structure which is arranged at two abutting structural panels (1, 2) so that said structural panels are connected with each other, comprising two pairs of clamping plates, with one of said pairs of clamping plates being fixed to one structural panel (1), and the other pair of clamping plates being fixed to the other structural panel (2). The two pairs of clamping plates abut against each other with one of their clamping plates (3, 4), and the two abutting clamping plates (3, 4) are provided with mutually aligned, undercut longitudinal slots (5) which receive a connecting plate (6) connecting the abutting two clamping plates (3, 4) with each other and being fixed to the two clamping plates (3, 4) by means of fasteners (7) which extend through said connecting plate (6). Thus, a mounting structure is provided whose manufacture is relatively easy and cost-efficient.

7 Claims, 8 Drawing Sheets

U.S. PATENT DOCUMENTS 6,745,538 B1 * 6/2004 Marinoni ................... 52/584.1

FOREIGN PATENT DOCUMENTS

| EP | 0 282 809 | 9/1988 |
| TW | 29841 | 4/1979 |
| TW | 30873 | 7/1979 |
| WO | WO 97/23699 | 7/1997 |
| WO | WO 01/09469 | 2/2001 |

* cited by examiner

MOUNTING STRUCTURE

CROSS-REFERENCE TO RELATED APPLICATIONS

This application is a continuation of application Ser. No. 10/048,335 filed Apr. 25, 2002, now U.S. Pat. No. 6,745,538, for Mounting Structure, which is a 371 of PCT/EP99/05540, filed Jul. 30, 1999.

BACKGROUND OF THE INVENTION

1. Field of the Invention

The present invention relates to a mounting structure for two abutting structural panels, in particular, glass panels, by which said two panels may be connected with each other.

2. Description of the Prior Art

In a prior art, two laterally abutting structural panels are connected with each other by pairs of clamping plates comprising two plane clamping plates between which the two adjacent lateral edges of the two structural panels are clamped that the two panels are fixed to each other.

In another prior art, two abutting structural panels are connected by two L-shaped planar clamping plates which are arranged opposite each other, with each of the structural panels being arranged and clamped between one pair of opposing legs of the L-shaped clamping plates.

Two angularly arranged structural panels are conventionally connected by clamping said panels between two angularly formed clamping plates. Said clamping plates are formed by joining two clamping plate portions at a predetermined angle by welding so that an angular clamping plate is formed which defines two clamping planes. Thus, it is necessary to prepare clamping plates having the required angle, and to provide them at the site of assembly.

OBJECTS AND SUMMARY OF THE INVENTION

It is an object of the present invention to provide a mounting structure of the initially described type whose manufacture is relatively easy and inexpensive, Preferably, the mounting structure of the present invention is to be used for structural panels, and in particular glass panels, which are arranged at an angle.

According to the present invention, a mounting structure which may be used for connecting two abutting structural panels, in particular glass panels, with each other comprises two pairs of clamping plates, with one pair of said clamping plates being fixed to one of the structural panels, and the other pair of clamping plates being fixed to the other structural panel, so that each of the two structural panels is clamped between the two clamping plates of the respective pair of clamping plates, with the two pairs of clamping plates abutting against each other with one of their clamping plates, and the two abutting clamping plates being provided with mutually aligned, undercut longitudinal slots which receive a connecting plate connecting the abutting clamping plates with each other and being fixed to the two clamping plates by means of fasteners which extend through said connecting plate.

Preferably, all individual clamping plates of the pairs of clamping plates are of identical cross-sectional shape so that they may be arbitrarily used and interchanged with each other, with their lengths differing in accordance with the particular application. The clamping plates which have an undercut longitudinal slot formed in their surface facing away from the clamping surface are formed as extruded sections, or rolled profiles. The clamping plates may be cut from the sections or profiles to any appropriate length. Each of the structural panels and clamping plates comprises at least one through opening through which a locking screw may be inserted so that a clamping connection is established between the two clamping plates and the structural panel arranged therebetween. In the clamping plates, said through openings are preferably formed within the undercut longitudinal slot, and are designed as longitudinal openings so that possible dimensional deviations of the openings in the structural panels may be compensated for during assembly of the clamping plates with the panel. Thus, it may be ensured that the outer edges of the clamping plates and the respective structural panel are flush with each other, even if the opening in the panel was not manufactured with sufficient accuracy. The head of the locking screw and the associated nut are formed such that they are flush with the respective outer surface of the clamping plate, and that their top surfaces do not protrude from the outer surfaces of the opposing clamping plates. After a pair of clamping plates has been mounted on each structural panel, the panels may be connected with each other by inserting one end of a connecting plate into the undercut longitudinal slot of one of the two clamping plates, after which said end is fixed in this slot, so that the other, free end of the connecting plate protrudes from said slot and thus from the edge of the structural panel. Then, the second structural panel may be abuttingly connected with the first panel by inserting the free, protruding end of the connecting plate into the longitudinal slot of one clamping plate of the second panel so that the two clamping plates abut against each other. The two abutting structural panels are connected with each other when the connecting plates in both abutting clamping plates are fixed by means of fasteners extending through said connecting plates. The mounting structure according to the present invention comprising the pairs of clamping plates with mutually aligned longitudinal slots may be easily and cost-effectively manufactured, and may furthermore provide for a simpler assembly of abutting structural panels.

According to an embodiment of the present invention, the two abutting clamping plates are each provided with at least two mutually aligned longitudinal slots 5o that the two abutting clamping plates, and thus structural panels, may be connected by means of two connecting plates to provide a more stable connection of the two structural panels, if necessary. The clamping plates may also each be provided with three longitudinal slots to be mutually aligned. In this case, a connecting plate connecting the clamping plate with the respective structural panel may for example be inserted in the uppermost and lowermost pair of mutually aligned slots, whereas the intermediate pair of slots comprises the through openings enabling the clamping connection of the pairs of clamping plates with the respective structural panel. Depending on the size of the abutting structural panels, two or more pairs of adjacently arranged clamping plates may be provided at the structural panels.

According to a further embodiment of the present invention, the two pairs of clamping plates are arranged such that a lateral end wall of each clamping plate of each pair abuts against a lateral end wall of a clamping plate of the other pair, and both clamping plates of each pair are provided with undercut longitudinal slots to be aligned with the slots of the abutting clamping plate and wherein connecting plates are fixed by means of fasteners.

According to another embodiment of the mounting structure of the present invention, the abutting clamping plates are arranged such that their longitudinal slots are in transverse or longitudinal alignment with each other, with an angle being included between them, and the connecting plates are formed accordingly to have an angular shape. By means of the mounting structure comprising said clamping plates, it is possible to connect abutting structural panels at any desired angle so that the structural panels received between the clamping plates may be assembled at different planes, which preferably include an angle in the range between 30° and 160°. The structural panels are connected with each other as described above, with only the connecting plates requiring an angular shape. The connecting plates may be bent to the required angular shape directly at the assembly site so that welding operations as required by prior art clamping plates are no longer necessary.

According to another embodiment of the present invention, both clamping plates of one pair of clamping plates abut against one and the same clamping plate of the other pair of clamping plates. In this embodiment, the first pair of clamping plates may for example be arranged at the centre of the lower end wall of a structural panel, and the two clamping plates of the second pair may for example be arranged in perpendicular alignment with one of the clamping plates of the first pair, with the longitudinal slots of the abuttingly aligned clamping plates being in transverse alignment with each other. The two clamping plates of the second pair are each connected with the clamping plate of the first pair by means of a rectangularly formed connecting plate. This clamping plate arrangement enables the connection with each other of two perpendicularly arranged structural panels. Further, a third pair of clamping plates may be arranged in perpendicular alignment with the other clamping plate of the first pair of clamping plates, so that a third structural panel may be connected perpendicularly to the first structural panel. This embodiment is particularly advantageous for four-wing revolving doors, for example. It is further possible to arrange several pairs of clamping plates so that they abut against and are perpendicular to one and the same clamping plate of the first pair of clamping plates. The mounting structure according to the present invention having pairs of clamping plates with mutually aligned longitudinal slots may be used for numerous combinations of abutting structural panels. Another advantage of the mounting structure according to the present invention consists in the fact that it enables the connection with each other of structural panels of different widths, since the connecting plates may be aligned with each other during assembly in accordance with the particular widths of the structural panels to be connected.

According to another embodiment of the mounting structure of the present invention, two pairs of clamping plates are arranged such that an end wall of one clamping plate of the first pair abuts against an end wall of one clamping plate of the second pair, whereas the other clamping plate of each pair abuts against one of the clamping plates of a third pair of clamping plates fixed on both sides of a further structural panel, with said third pair of clamping plates being provided with longitudinal slots in which connecting plates may be fixed so that the third pair of clamping plates may be connected with the two other pairs of clamping plates by means of said connecting plates. This arrangement is particularly advantageous for the assembly of three-wing revolving doors, for example, wherein any two structural panels are arranged at the same angle.

In contrast with the conventional mounting structure comprising preformed angular clamping plates, all the above described embodiments of the present invention may be easily adjusted to the particular case of need by bending the connecting plates to the required shape at the site of the assembly. The plane clamping plates may be provided as sections of several lengths, with the through openings for the locking screws being formed during the cutting of the sections. In all above described embodiments, connecting plates of one and the same shape may be used which merely have to be bent to the required angle.

According to still another embodiment of the present invention, an angularly shaped connecting plate is provided with two recesses in its portion protruding from the undercut longitudinal slot of its associated clamping plate, in which recesses the two shoulders of the longitudinal slot of the other clamping plate may be received. The connecting plates may either be preformed with said recesses, or the recesses may be cut at the site of the assembly.

According to still another embodiment of the present invention, the longitudinal slot of the clamping plate of the first pair of clamping plates against which the two clamping plates of a second pair are to be abutted is provided with recesses in its shoulders through which the leg of a corresponding angular connecting plate may protrude so that it engages said longitudinal slot. In this embodiment, one of the legs of a connecting plate is first inserted through said recesses into the longitudinal slot, and then longitudinally displaced within said slot to a position within the slot at which its entire length is covered by the shoulders of the slot, or at which the other leg of the connecting plate, which protrudes from said slot, abuts against the shoulders of the slot at the edge of the recess. Subsequently, one of the legs of a second connecting plate may be inserted through the recess into said slot, and longitudinally displaced within said slot in an opposite direction as compared to the first displacement, so that the two legs of the two connecting plates protruding from the slot, which were first adjacent to each other, may be arranged at a distance as required for the insertion of a pair of clamping plates having a structural panel clamped between them. The size of the recesses to be provided in the slots depends on the length of the legs of the connecting plates to be inserted, and the recess is designed such that two legs may be inserted through it, and that at least the major part of the length of the leg of the second connecting plate to be inserted will be covered by the shoulder of the slot. Preferably, said recesses are cut out from the shoulders as required at the assembly site.

However, it is also possible to provide clamping plates with mutually aligned longitudinal slots of different widths. According to this embodiment, the legs of the angular connecting plates are also of different widths so that they match the width of the respective longitudinal slot. This is particularly advantageous for arrangements with transversely aligned longitudinal slots, since it obviates recesses in the shoulders of the slots and in the connecting plates.

The connecting plates are preferably clamped against the shoulders of the respective undercut slot by means of locking screws such as grub screws so that the free ends of the locking screws do not protrude from the outer surface of the clamping plate. However, it is also possible to provide the clamping plates with tap holes into which screws protruding from the connecting plate may be threaded so that the respective connecting plate is screw-fitted with the clamping plate.

According to yet another embodiment of the present invention, the undercut longitudinal slots of at least one of the clamping plates of a pair of clamping plates are provided with mounting inserts, inserted supporting elements for the structural panels, hinges or the like.

BRIEF DESCRIPTION OF THE DRAWINGS

The present invention will now be described in more detail with reference to the accompanying drawings showing embodiments of the present invention, wherein.

DETAILED DESCRIPTION OF THE PREFERRED EMBODIMENTS

Figure 1:
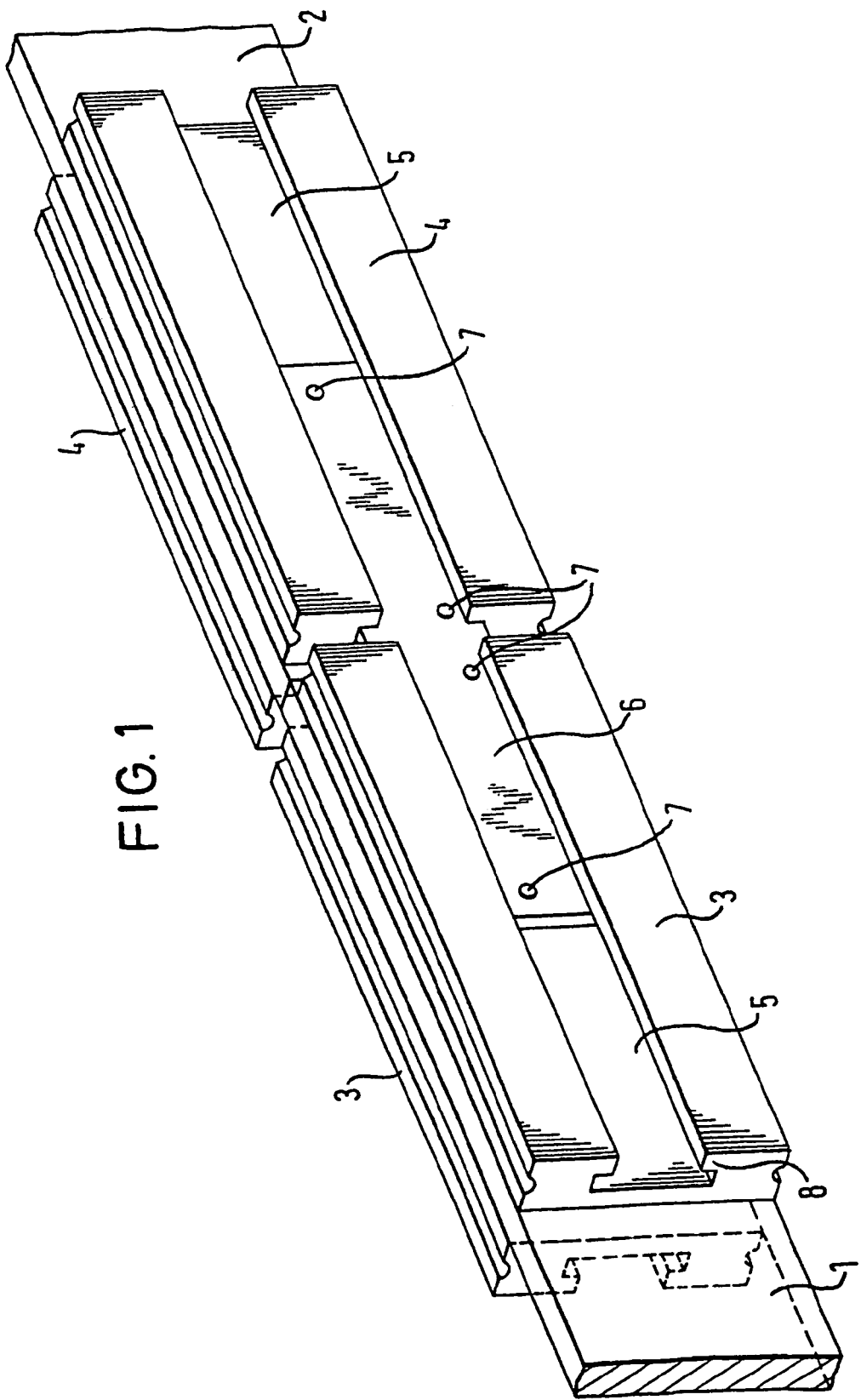
FIG. 1 shows a mounting structure wherein the clamping plates are arranged with abutting end walls and mutually aligned longitudinal slots.

FIG. 1 shows a mounting structure which is installed at two abutting structural panels 1, 2. Each structural panel 1, 2 is provided with a pair of clamping plates 3, 3 and 4, 4, respectively, so that the panels are clamped between the respective pair of clamping plates. The two pairs of clamping plates are arranged such that a clamping plate 3 abuts against a clamping plate 4. The clamping plates 3, 4 are provided with mutually aligned, undercut longitudinal slots 5. The respective slot 5 has a T-shape in cross-section, thereby being defined by two laterally provided and longitudinally extending U-legs and by two corresponding shoulders 8 which are connected to the U-legs and which extend inwardly towards each other, thereby defining an undercut between an underside of the shoulders 8 and a bottom of the slot 5. A connecting plate 6 is received within the aligned slots 5 of each two clamping plates 3, 4 so that the structural panels 1, 2 are connected with each other. The connecting plate 6 is fixed against shoulders 8 formed on the longitudinal slot 5 by means of locking screws 7. The locking screws are threaded into the connecting plate 6, thereby abutting on the bottom of the slot 5, whereby the connecting plate 6 is lifted and clamped against the underside of the shoulders 8. This provides a very flexible and easily operable fixing mechanism, since the connecting plate 6 has not to be precisely located at a specific position within the slot 5 in order to achieve a safe fixation. In the following embodiments, although not further described, the respective undercut slots 5 are of the same structure.

Figure 2:
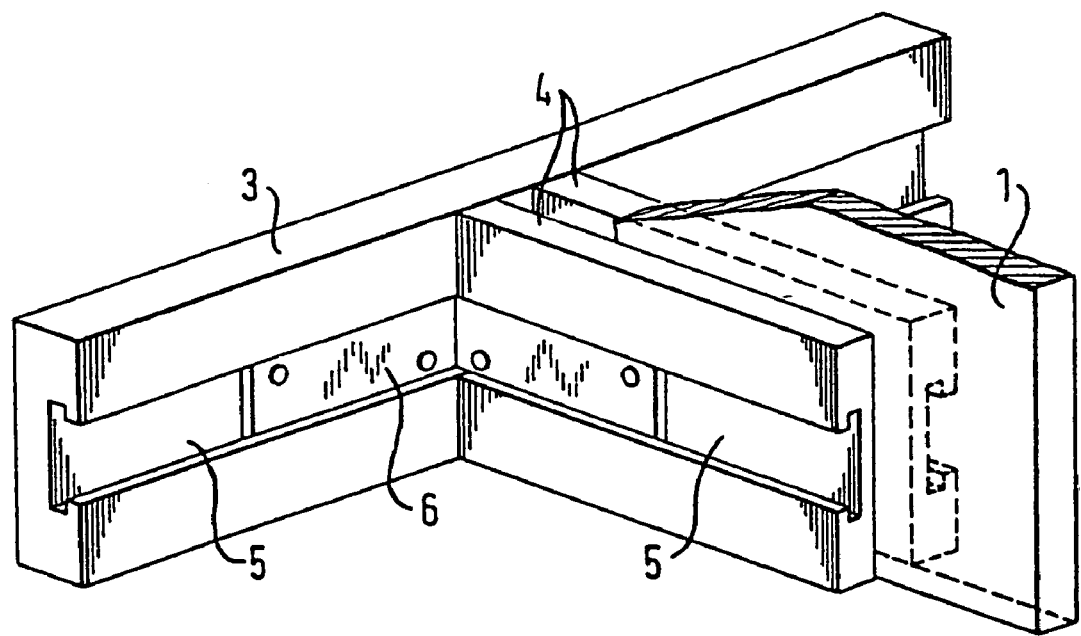
FIG. 2 shows a mounting structure with transversely aligned clamping plates.

In FIG. 2, the longitudinal slots 5 of the clamping plates 4 of the one pair of clamping plates are transversely aligned with the longitudinal slot 5 of a clamping plate 3 of the other pair, with the connecting plate 6 being formed accordingly, i.e. angular.

Figure 3:
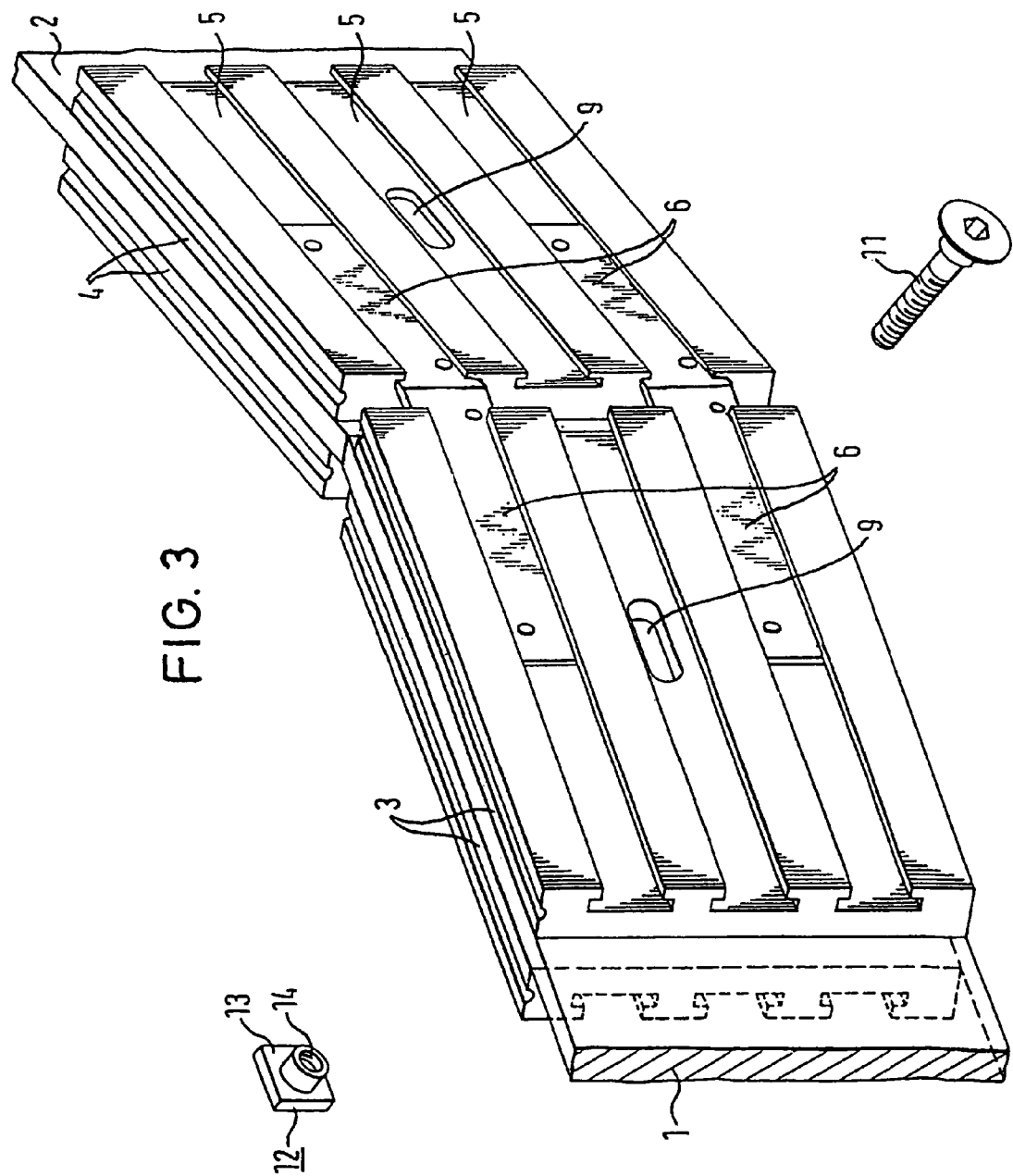
FIG. 3 shows a mounting structure according to the present invention, wherein the clamping plates are arranged with abutting end walls and mutually aligned longitudinal slots to enable the connection of structural panels which are to be arranged in two different planes.

In FIG. 3, the longitudinal slots 5 of the abutting clamping plates 3, 4 are formed such that they include an angle, thus enabling the arrangement of structural panels in two different planes. Each of the clamping plates 3, 4 comprises three longitudinal slots 5 to provide for a particularly stable arrangement. Angular connecting plates 6 are received in the uppermost and lowermost longitudinal slots 5. An elongate opening 9 is formed in each of the intermediate slots 5 of the clamping plates 3, 4, and the structural panels 1, 2 are provided with circular openings (not shown). The openings 9 in the clamping plates 3, 4 are preferably formed as elongate openings to allow for a certain adjustment in the case of any manufacturing inaccuracies of the circular openings in the structural panels 1, 2. The structural panels 1, 2 are fixed between the respective pair of clamping plates by means of screw connections each comprised of a screw 11 and a nut 12. The nut 12 is in the form of a square plate 13 so that it is fixed against rotation when being inserted in the longitudinal slot 5 of a clamping plate 3, 4. The nut 12 having the above shape is an example of the mounting inserts which may be received in the longitudinal slots. The square plate 13 of the nut 12 is provided with a cylindrical extension 14 which protrudes into the opening 9. The length of the nut 12 corresponds to the thickness of the clamping plate 3, 4 so that the nut 12 is flush with the clamping plate 3, 4 after being received therein. The screw 11 comprises a screw head which is provided with a hexagonal recess and engages with the longitudinal slot 5. The screw head is formed with a cylindrical extension which engages the opening 9 of the respective other clamping plate 3, 4, and is formed such that it may be received in the clamping plate 3, 4 to be flush with the outer surface of the clamping plate, and does not protrude from the longitudinal slot 5. In a possible modification of the described embodiment, the openings 9 may also be formed in any of the other slots and in the case of clamping plates 3, 4 comprising several slots 5, connecting plates may be fixed in only one or in all of the slots.

Figure 4:
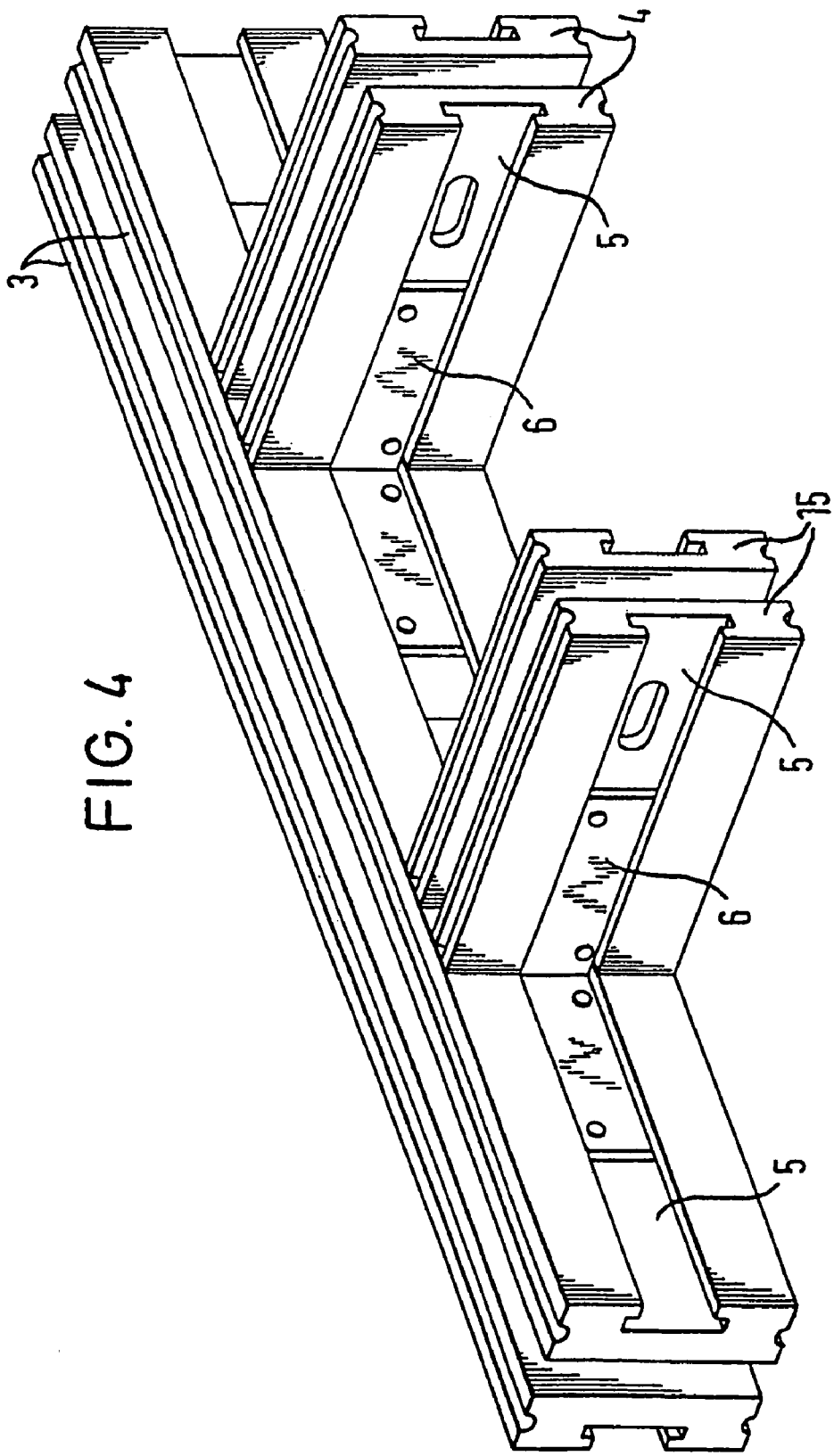
FIG. 4 shows a mounting structure wherein two pairs of clamping plates are arranged at one clamping plate of a further pair of clamping plates.

FIG. 4 shows a mounting structure wherein a clamping plate 3 of one pair of clamping plates is connected with each two clamping plate further pairs of clamping plates, with the longitudinal slots 5 of the clamping plates 4, 15 being in alignment with the slot 5 of clamping plate 3. In this embodiment, the clamping plates 3 are comparatively longer than in the previous embodiments. One clamping plate 3 of the one pair is adjoined by both clamping plates 4, 15 of the two other pairs so that the clamping plates 4, 15 are arranged transversely to the clamping plate 3, with their longitudinal slots 5 being in alignment. Clamping plate 3 is connected with the two pairs of clamping plates 4, 15 by means of connecting plates 6 fixed in the longitudinal slots 5. Since the transversely arranged clamping plates 4, 15 are not fixed at the clamping plate 3 by welding, they may be arranged at any desired position or distance from each other, and so may the respective structural panels.

Figure 5:
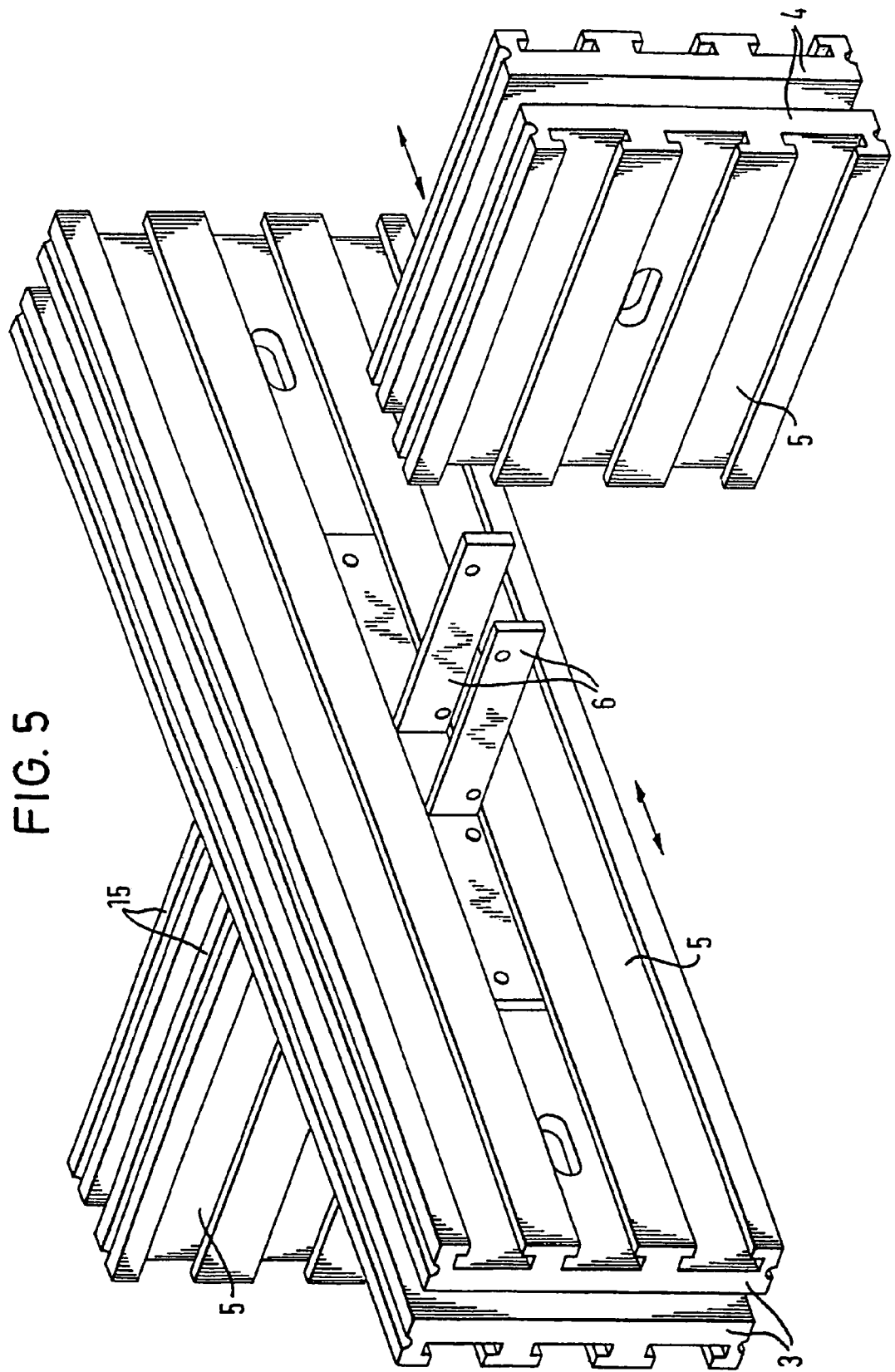
FIG. 5 shows another mounting structure having three differently arranged pairs of clamping plates.

In FIG. 5, the two clamping plates 4 of a first pair are arranged transversely to one clamping plate 3 of a second pair, with their longitudinal slots 5 being in alignment, and the two clamping plates 15 of a third pair are arranged transversely to the other clamping plate 3 of the second pair with their longitudinal slots 5 being in alignment. Thus, it is possible to both arrange the clamping plates 4 at any desired position between the lateral edges of plate 3, and to choose any desired distance between the plates 4 in accordance with the thickness of the structural panel to be clamped between the plates.

Figure 6:
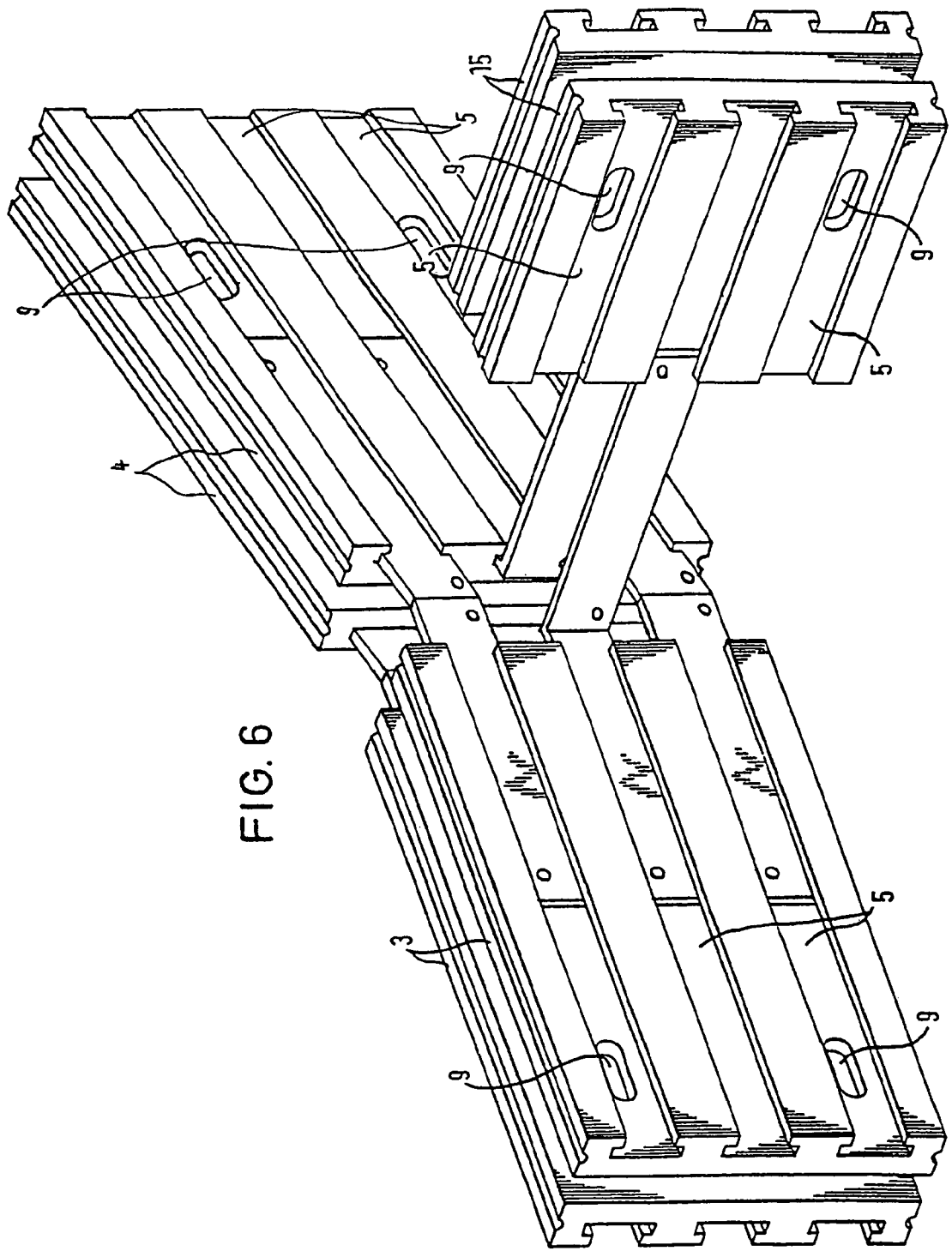
FIG. 6 shows yet another mounting structure having three differently arranged pairs of clamping plates.

FIG. 6 shows a mounting structure for structural panels, wherein two pairs of clamping plates are arranged such that an end wall of one clamping plate 3 of the first pair abuts against an end wall of one clamping plate 4 of the second pair so that the structural panels associated with said pairs of clamping plates are arranged in two different planes. The two pairs of clamping plates are connected by connecting plates 6 arranged in the uppermost and lowermost slot 5 of the two abutting plates. The through openings 9 for fixing the structural panels are also formed in the uppermost and lowermost slots 5. One clamping plate of each pair 3, 4 has an angularly formed connecting plate 6 which is provided in its intermediate slot 5 and enables the attachment of another pair of clamping plates 15 so that the intermediate longitudinal slot 5 of one clamping plate of each pair 3, 4 may be aligned with the intermediate slot 5 of another clamping plate 15.

Figure 7:
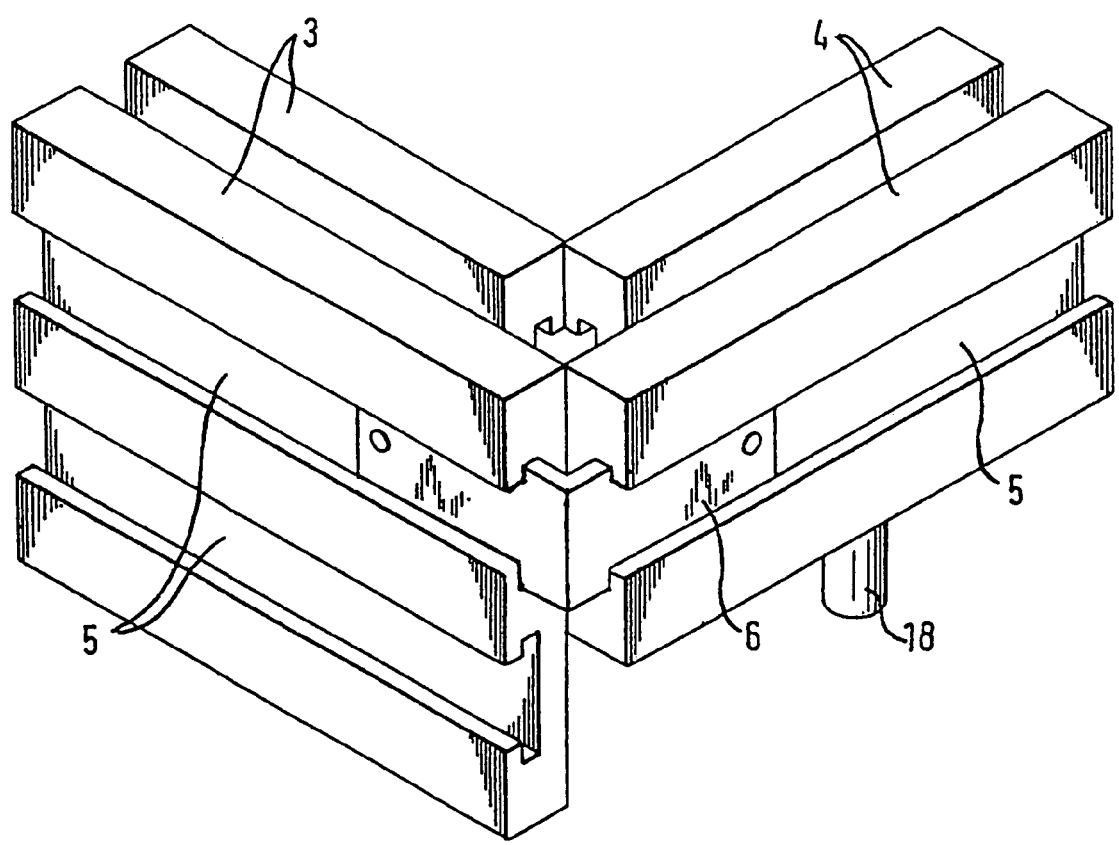
FIG. 7 shows a mounting structure having two differently formed pairs of clamping plates.

FIG. 7 shows a mounting structure wherein the pairs of clamping plates 3, 4 are formed differently. Whereas the pair of clamping plates 3 comprises two longitudinal slots 5 allowing for the attachment of a structural panel, the clamping plates 4 of the other pair comprise only one longitudinal slot 5. The upper slots 5 of the clamping plates 3 are aligned with the slots 5 of the other clamping plates 4. One longitudinal slot of one clamping plate 4 of the narrower pair has an insert arranged therein which comprises a downwardly facing pin 18 by means of which a revolving door may be supported, for example. Further, a hinge body may be inserted and fixed in each of the longitudinal slots either in addition to a connecting plate or other insert, or in an otherwise empty longitudinal slot, with said hinge body comprising an opening wherein a pivot pin or locking pin may be received and supported, for example, by means of which the structural panel may be supported. Said hinge body comprises a bracket-type extension at its side facing the longitudinal slot, which is received in said slot and clamped therein. The portion of the hinge body comprising the opening protrudes from the clamping plate, with the longitudinal axis of the opening running parallel to the structural panel received by the clamping plate.

Figure 8:
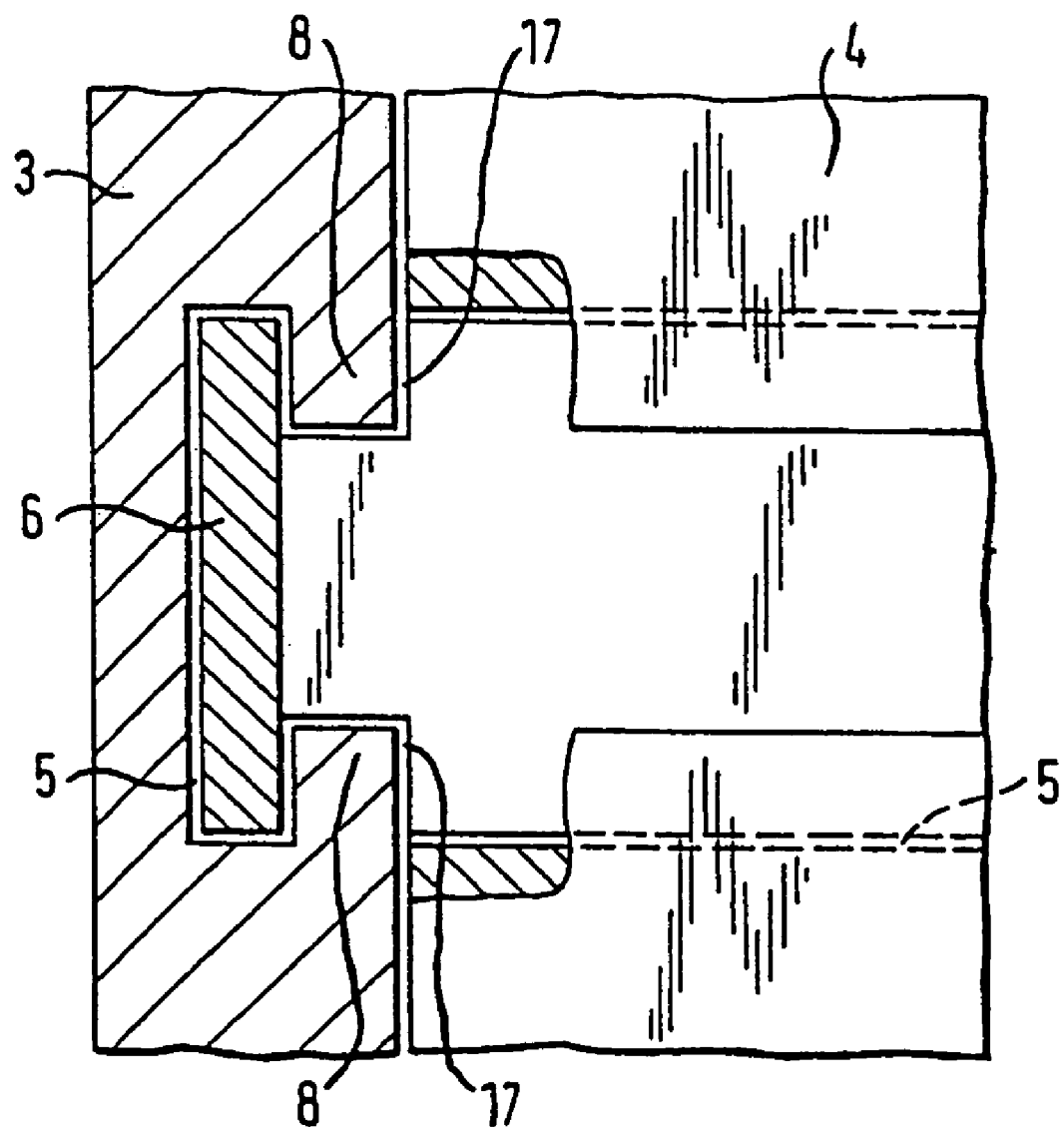
FIG. 8 is a schematic view of the angular connecting plate according to claim 7 of the present invention.

FIG. 8 shows a schematic view of a mounting structure having two transversely abutting clamping plates 3, 4 whose longitudinal slots 5 are in mutual alignment, with one clamping plate 4 of the one pair abutting between the lateral edges of one clamping plate 3 of the other pair. The longitudinal slots 5 accommodate the connecting plate 6 which has two recesses 17 in its leg protruding from the undercut longitudinal slot 5 of its associated clamping plate 4. In said recesses 17, the shoulders 8 of the longitudinal slot 5 of the other clamping plate 3 are received.

What is claimed is:

1. A mounting structure which is arranged on two abutting glass panels (1, 2), so that the glass panels are connected with each other, the mounting structure comprising:

two pairs of clamping plates (3, 4), with the clamping plates of one of said pairs being fixed to opposite sides of one of said glass panels, and with the clamping plates of the other pair being fixed to opposite sides of the other one of said glass panels, with the inner sides of the clamping plates abutting the corresponding sides of the glass panels (1, 2), wherein the clamping plates (3, 4) of each pair of clamping plates have, at the outer sides thereof, undercut longitudinal slots (5) with a bottom and undercut shoulders (8), with the clamping plates of one pair (4) abutting at least one clamping plate of the other pair (3) in a manner that the undercut slots of the abutting clamping plates are mutually aligned; and a connecting plate (6) located in the mutually aligned longitudinal slots of two of the abutting clamping plates and fixed to the abutting clamping plates (3, 4) by locking screws (7) which are threaded through the connecting plate (6) and abut against the bottom of the mutually aligned longitudinal slots (5) to push the connecting plate against the inner sides of the undercut shoulders (8) of the respective undercut slot (5) in the abutting clamping plates (3, 4), thereby connecting the abutting clamping plates together.

2. The mounting structure according to claim 1, wherein each of the clamping plates (3, 4) on each side of the glass panels abut against each other in an end-to-end alignment allowing the connecting plate (6) to be located at any position along the longitudinal slot (5).

3. The mounting structure according to claim 1, wherein the abutting clamping plates (3, 4) abut each other in an angle therebetween, and wherein the connecting plate (6) has a corresponding angle.

4. The mounting structure according to claim 2, further comprising a third pair of clamping plates (15) fixed to opposite sides of a further glass panel and which are provided at their outer sides thereof with undercut longitudinal slots (5) with undercut shoulders, wherein one clamping plate (15) of the third pair transversely abuts one of the clamping plates (4) of the one of the first-mentioned pairs (3, 4) in a manner that the respective longitudinal slots (5) are mutually aligned, and wherein the other clamping plate (15) of the third pair transversely abuts one of the clamping plates (3) of the other of the first-mentioned pairs (3, 4) in a manner that that the respective longitudinal slots (5) are mutually aligned, and wherein additional connecting plates (6) are located in the mutually aligned longitudinal slots (5) to connect the third pair of clamping plates (15) to the first-mentioned two pairs of clamping plates (3, 4).

5. The mounting structure according to claim 3, with the angular connecting plate (6) comprising two recesses (17) which are formed in its leg (16) protruding from the undercut longitudinal slot (5) of the associated clamping plate (4), into which recesses two undercut shoulders (8) of the longitudinal slot (5) of the other clamping plate (3) engage.

6. The mounting structure according to claim 3, with the longitudinal slot (5) of the clamping plate (3) of the other pair of clamping plates which is abutted by the two clamping plates (4) of the one pair of clamping plates having recesses formed in its undercut shoulders (8) which are protruded by the leg of the respective associated angular connecting plate (6) engaging said longitudinal slot (5).

7. The mounting structure according to claim 1, with the undercut longitudinal slots (5) of at least one of the clamping plates (3, 4) of a pair of clamping plates being provided with mounting inserts for supporting elements for structural panels or hinges.

* * * * *